C. A. ROHLAND.
MACHINE FOR THE MANUFACTURE OF VACUUM WALL CONTAINERS.
APPLICATION FILED APR. 2, 1921.
1,436,197.
Patented Nov. 21, 1922.
4 SHEETS—SHEET 3.
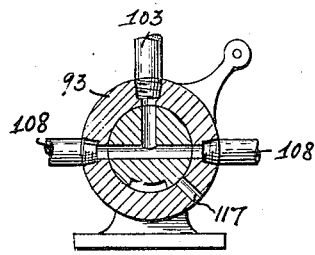
Fig. 9.
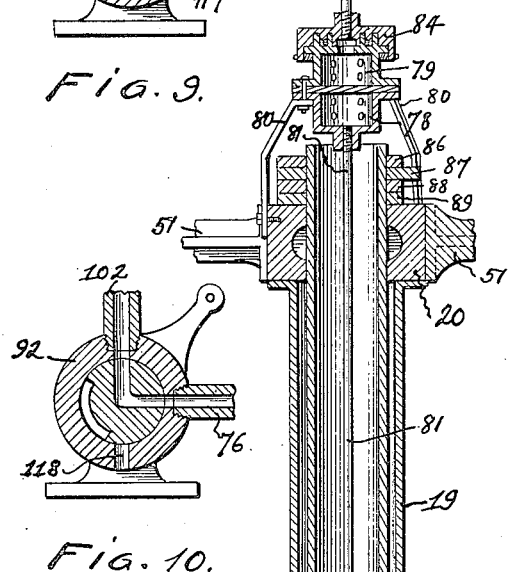
Fig. 10.
Fig. 4.
Fig. 3.
Witness
T. M. Overman
Inventor
Charles A. Rohland,
By N. G. Schwenborn
Attorney

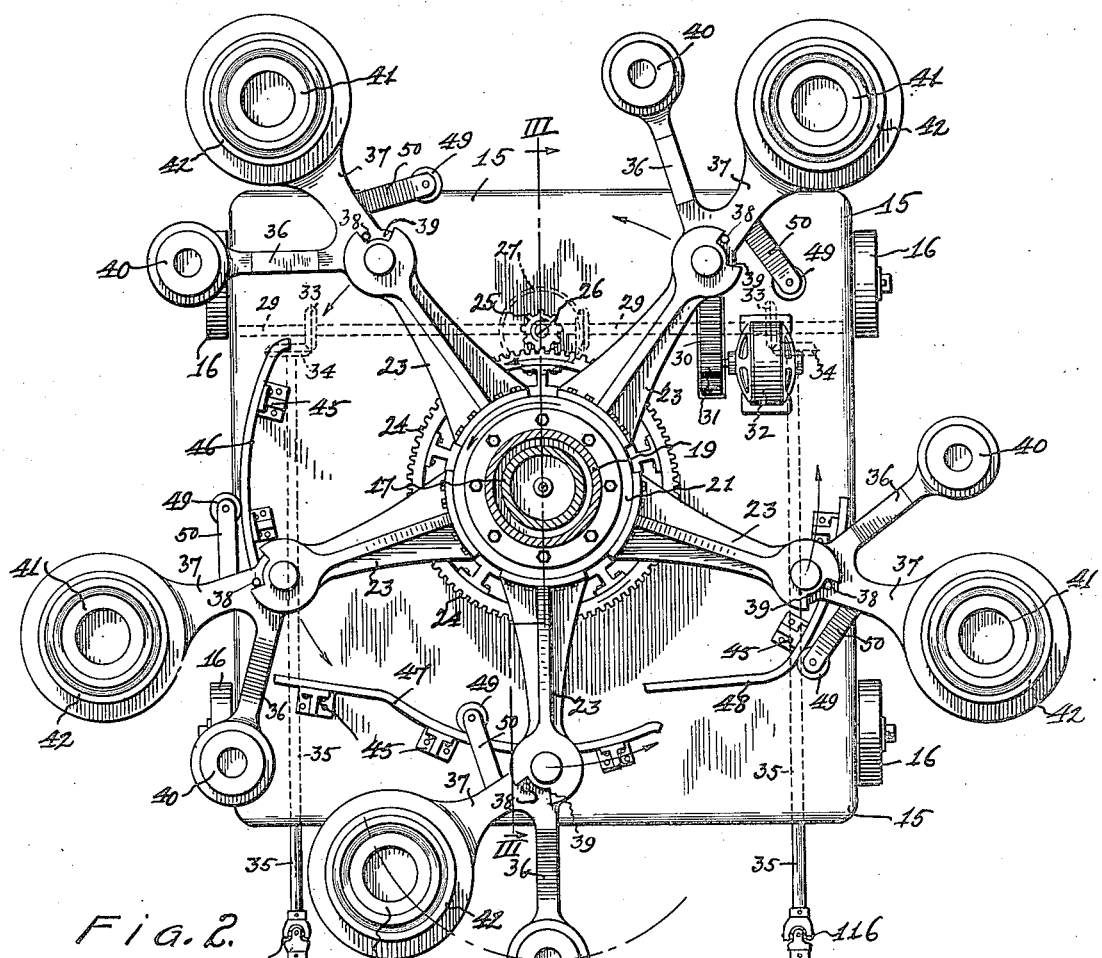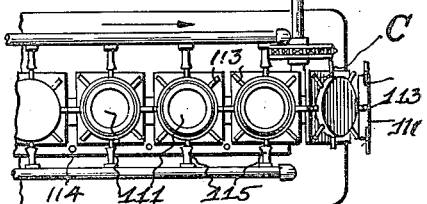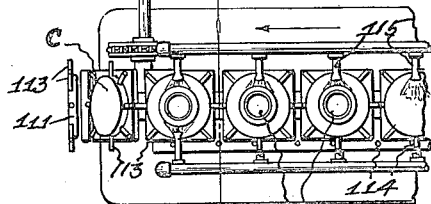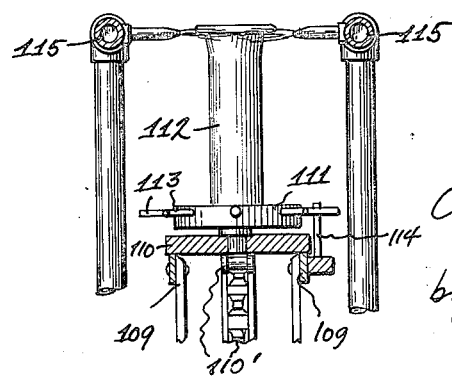

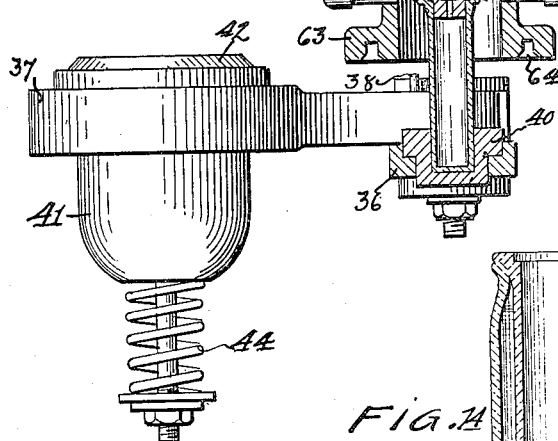

Patented Nov. 21, 1922.

1,436,197

UNITED STATES PATENT OFFICE.

CHARLES A. ROHLAND, OF UNIONTOWN, PENNSYLVANIA, ASSIGNOR, BY DIRECT AND MESNE ASSIGNMENTS, TO VACUUM GLASS MACHINE COMPANY, OF UNIONTOWN, PENNSYLVANIA, A CORPORATION OF DELAWARE.

MACHINE FOR THE MANUFACTURE OF VACUUM-WALL CONTAINERS.

Application filed April 2, 1921. Serial No. 458,117.

*To all whom it may concern:*

Be it known that I, CHARLES A. ROHLAND, a citizen of the United States, and a resident of Uniontown, in the county of Fayette and State of Pennsylvania, have invented certain new and useful Improvements in Machines for the Manufacture of Vacuum-Wall Containers, of which the following is a specification.

This invention relates to a machine for manufacturing vacuum wall containers or receptacles of any size, capacity, shape or design, and it has for its object to reduce the steps of operation and labor in producing said containers at a minimum of cost and in great quantities.

A further object is to provide a machine of the character above indicated which will be able to produce vacuum walled containers, which when made of glass to eliminate the use of quicksilver lining, so that the same will be transparent and enable any foreign matter in the container to be readily detected and detached, and especially adapt the same for use as a cheap and highly efficient carrier for milk, cream or other liquid and perishable food products.

Another object of the invention is to so construct and arrange the parts of the machine in order to enable the same to have the general form and character of the standard glass bottle blowing machine which is provided with a central upright standard or column on a fixed base and provided with rotary arms; and hence adapt the same to be readily installed or used in the glass bottle plants as now designed and without in any way changing the arrangements and constructions of the different machines or auxiliary appliances, such as the air pressure or exhausting devices.

Other objects and advantages of the invention will be manifest and fully understood from the detailed description which will be hereinafter more fully disclosed.

The invention consists of structural characteristics and relative arrangements of parts which will be hereinafter more fully described and particularly pointed out in the appended claims.

In the four sheets of drawings, similar reference characters indicate the same parts on the several figures in which, Figure 1, is a side elevation of the improved machine with the side conveyors and two back arms removed for purpose of clearness;

Figure 2, is a plan view taken on a line II—II of Figure 1;

Figure 3, is a section taken on line III—III of Figure 2;

Figure 4, is an enlarged top plan and fragmentary view of one of the arms with its attached lifting cylinder, picking up device and vacuum head;

Figure 5, is a fragmentary side elevation partly in section showing the vacuum head in the act of picking up an inner section of a vacuum container;

Figure 6, is a view and section similar to Figure 5, showing the position of parts just before the air is exhausted from the space between the inner and outer sections or shells of a vacuum container;

Figure 7, is an enlarged sectional view taken on line VII—VII of Figure 2;

Figure 8, is an enlarged transverse sectional view of one of the two-way valves controlling the air pressure for raising and lowering the vacuum heads;

Figure 9, is an enlarged transverse sectional view of one of the valves controlling the vacuum or pressure within a vacuum head;

Figure 10, is an enlarged transverse sectional view of one of the valves controlling the suction for holding the inner section or shell of the vacuum wall container;

Figure 11, is a longitudinal sectional view of the valves shown in Figures 8, 9, and 10;

Figure 12, is a sectional view of the inner shell of a vacuum wall container;

Figure 13, is a sectional view of the outer shell of a vacuum wall container, and Figure 14, is a sectional view of a finished vacuum wall container assembled by the machine;

Figure 1:
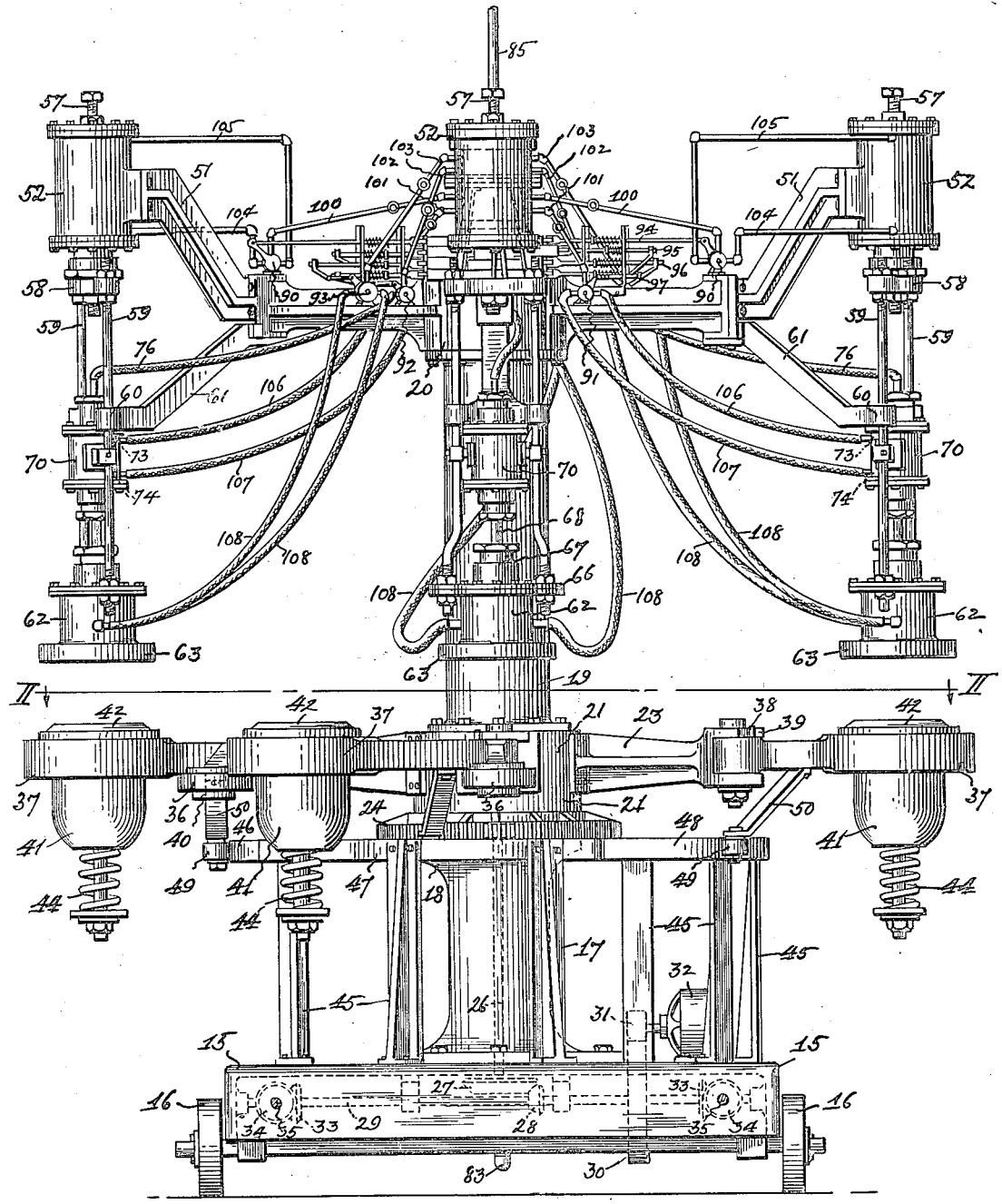

Referring to the drawings in which the preferred form of the invention is illustrated, 15 is the base which is preferably provided with rollers 16, 16, for the purpose of permitting the machine to be easily moved about, as is common in this class of apparatus. Rigidly supported and carried by said base 15 is a hollow column or standard 17 having a ledge 18 near its lower end, as clearly shown in Figure 3. Surrounding the upper section of said column 17 is provided a rotary sleeve 19 having connected at its upper end a collar 20 and at its lower end a similar collar 21, said collar 21 being rotatably carried by the ledge 18 by means of ball bearings 22 and is provided at its upper edge with any number of horizontal radial arms 23, preferably five as shown depending on the conditions of service desired, and its lower edge with a gear wheel 24, said gear 24 being in mesh with a pinion 25 at the upper end of rotatable vertical shaft 26 carrying at its lower end a bevel gear 27. Bevel gear 27 meshes with a corresponding bevel gear 28 carried by a shaft 29 rotated by gear 30 which in turn is rotated by a gear 31 operated by any suitable motor 32.

Shaft 29 carries at each of its ends, see Figures 1 and 2, a bevel gear 33 which meshes with gears 34 carried by shafts 35, 35, at right angles to shaft 29 for purposes to be presently described.

Pivotally supported on the outer ends of the rotary arms 23, 23, see Figures 1 and 2, are swinging or oscillating double arms having branches 36 and 37, said branches being so constructed and arranged at their pivotal ends as to permit said branches to oscillate or swing through a given and determinate angle by means of a pin 38 attached to said branches 36 and 37 acting against the ends of an arcuate slot 39, as will be readily understood. Branch 36 is provided with a holder 40, see Figure 5, for the inside shell forming the inner section of the vacuum container, while the branch 37 carries the removable holder 41 for the outer shell of the container, said holder 41 having its upper ledge provided with a V-shaped circular projection 42 and its lower inner portion having a false bottom or valve 43 adapted to be seated and seal the lower open end of the holder 41, said bottom 43 being normally held to its seat by means of a spring 44, as clearly shown in Fig. 6.

Attached to the base 15 by means of uprights 45, 45, are arranged a series of elevated cams 46, 47 and 48, which are so arranged and formed to cooperate with an anti-friction roller 49 on the end of an arm 50 rigidly secured to each set of branches 36 and 37, as shown in Figures 1 and 2, for the purpose of swinging or oscillating said branches while rotating with the arms 23 about the central column or standard 17, in the direction of the arrows indicated in Figure 2.

Rigidly secured to the upper collar 20 and rotating with the sleeve 19 and lower arms 23, 23, are a series of upper horizontal arms 51, 51, similarly arranged and directly over the lower arms 23, 23, and each of said arms 51 is provided at its outer end with a cylinder 52 having a piston 53 connected to a rod 54, said cylinder having ports 55 and 56 leading to the opposite ends of said cylinder 52 and an adjustable stop 57 to limit the upward movement of said piston 53, as clearly shown in Fig. 6. The lower or outer end of each of the rods 54, 54, is preferably provided with a cross-arm or lateral extension 58, to which is secured a pair of depending rods 59, guided in suitable circular sockets or recesses 60 in the outer ends of forked stabilizing brackets 61, 61, secured to the underside of the upper arms 51, as shown in Figure 1. At the lower ends of each pair of rods 59, 59, is suitably secured a hollow vacuum head 62 whose lower end is open and provided with a flange 63 having a circular recess 64 adapted to register and engage the circular V-shaped projection 42 on top of holder 41, see Figure 6, and form an air-tight seal therewith as will be readily understood. Said hollow vacuum head 62 is provided with combined exhaust outlets and pressure inlets 65, 65, and a head 66 provided with a stuffing box 67. Passing through said stuffing box 67 is a hollow piston rod 68 having its lower end or section within the vacuum head 62 provided with a perforated plate or disk 69, so constructed and arranged as to be adapted to be snugly seated in the open end of an inner section forming a vacuum wall container, as shown in Figure 5, and the upper portion of the hollow rod 68 passes through an enclosed cylinder 70 having stuffing boxes 71, 71, said cylinder 70 being adjustably carried and rigidly supported by depending rods 59, 59. A section of the rod 68 within the cylinder 70 is connected to a piston 72 reciprocated within said cylinder by means of fluid pressure admitted in openings or ports 73 and 74 at the ends of the cylinder. Within the cylinder 70 and interposed between its lower head and piston 72 is provided a buffer spring 75 to ease up or gradually retard the downward stroke of said piston. The upper end and interior of the hollow piston rod 68 is connected by means of the flexible hose 76 to any suitable source of suction to be presently described. It will also be seen that the distance between the vacuum head 62 and the end of the rod 54, or from the outer end of the arms 23 or branches 36 and 37 can be readily adjusted by means of the set nuts 77, 77, on the ends of the rods 59, 59, as will be manifest by reference to Figure 6.

78 and 79 are respectively separated and independent pressure and vacuum chambers supported at the upper end of column 17 by means of brackets 80 connected to and rotating with the upper collar 20, as shown in Figure 3. The pressure chamber 78 is connected by means of a pipe 81 passing down through the hollow column 17 to a perforated ball joint 82 which joint is in communication in all its positions with a supply pipe 83 leading to any suitable source of fluid pressure. 84 is a head having a rotatable and sealing or air tight connection with the upper end of the vacuum chamber 79, and 85 is a pipe leading to the interior of said chamber 79 and connected with any suitable pump or other means for exhausting the air from said chamber 79.

Attached to and surrounding the upper end of the fixed hollow column or standard 17 are fixed and superimposed cam surfaces 86, 87, 88 and 89, as shown in Figs. 3 and 4. Rigidly secured to each of the upper rotary and horizontal arms 51, 51, are four oscillating valves 90, 91, 92 and 93, see Figures 4, 8, 9, 10 and 11.

Valves 90 and 91 are two-way valves of a construction shown in Figures 8 and 11, while valve 92 is of a construction shown in Figure 10, and valve 93 is as shown in Figure 9, each of said valves 92 and 93 have also a longitudinal section as illustrated in Figure 11. Slidingly supported and superimposed one above the other on each of the rotary arms 51, 51, are four cam rods 94, 95, 96 and 97, see Figs. 1 and 4, each of which rods is provided with a spring 98 to normally press an anti-friction roller 99 on their inner ends against its particular cam surface, so that rod 94 is operated by cam 86, rod 95 by cam 87, rod 96 by cam 88, and rod 97 by cam 89. Said rods 94, 95, 96 and 97 are also arranged and provided with links connecting the valves 90, 91, 92, and 93 so that rod 94 oscillates valve 90, rod 95 oscillates valve 91, rod 96 oscillates valve 92, and rod 97 oscillates valve 93. thus it will be seen that as the arms 51, 51, rotate about the column 17 the fixed cams 86, 87, 88 and 89 on said column are so formed and disposed that they will in turn reciprocate the cam rods in such a manner as to properly operate the valves 90, 91, 92 and 93, in their required sequence to connect with the pressure and vacuum chambers 78 and 79 for purposes to be presently described.

Each of said valves 90, 91, 92 and 93 has a port in its upper side, said ports of valves 90 and 91 connect by means of pipes 100, 101 with the air pressure chamber 78, while the similar ports of valves 92 and 93 connect by means of pipes 102 and 103 respectively with the vacuum chamber 79. Valve 90 by means of pipes 104 and 105 connect with the ends and ports 56 and 55 respectively of the cylinder 52. Flexible hose 106 and 107 connect ports of valve 91, similar to that shown in Figures 8, respectively, with the ports or openings 73 and 74 of cylinder 70. Valve 92 by means of flexible hose 76 connects the outer open end of the hollow piston rod 68 with the suction of the vacuum chamber 79, and valve 93 by means of flexible hose 108 and 108 connects the vacuum chamber 79 or atmospheric pressure with the ports 65, 65, in the vacuum head 62.

Referring to Figures 2 and 7, 109, 109 are guides or supports for an endless belt comprising a series of flexibly connected disks 110 preferably square in shape and carried by a sprocket chain 110'. Each disk 110 is provided with a rotatable pad 111 adapted to support and carry either an inner or outer section of a vacuum wall container 112, as shown. Each of said pads 111 is provided with horizontally projecting pins 113 so constructed and disposed as to be engaged by a series of vertically arranged projections 114, so that when the belts are moved in directions shown by the arrows, the pads 111 are rotated step by step by the engagement of pins 113 with projections 114, as will be readily understood. 115 represent a series of heating burners so disposed and arranged as to have their flames impinge against the upper portions of the outer or inner sections forming the vacuum container to retain the heat in said sections after passing from the blowing machines or molds in which they have been previously formed. The belts with connected disks 110 are operated by means of any suitable transmission gear connected to the shafts 35, 35, and needs no further description or disclosure, said connection being preferably by means of universal couplings 116, 116, so that the endless conveyers can be set at any angle to each other or base 15 of the machine, to satisfy various conditions for the efficient operation of the plant.

A series of outer sections O, of the vacuum walled containers of the shape, shown in Figure 13 for example, are made by the usual and well known form of bottle blowing machines and are placed on the rotatable pads 111 of the conveyer C, indicated at the left and bottom of Figure 2. On the conveyer c, at the right and bottom of Figure 2 are similarly placed on pads 111 a series of small or inner sections I, as shown in Figure 12. The inner blank sections I and outer blank sections O are carried on said conveyers towards each other, and the operator who is between the conveyers and adjacent to the improved machine, will feed into the holders 40 the inner sections I and in the holders 41 the outer sections. While said blank sections I and O are conveyed towards the operator as just described, their upper edges or surfaces which are to be sealed together to form vacuum walled containers are kept in a hot and sticky condition, while the body portions of said section I and O are allowed to chill to such an extent that said body portions will not be distorted during the operation of forming the vacuum between the inner wall of the outer section and the outer wall of the inner section.

The parts being constructed, arranged and disposed as described, the operation of the machine is as follows:

The operator now placed as just described, the lower arms 23 carrying the holders 40 and 41 and the connected sleeve 19 with upper arms 51 carrying the cylinders 52 and 70, and vacuum head 62 are rotated by starting the motor 32, which motor conveys its motion to gears 31 and 30, bevel gears 28 and 27, shaft 26, pinion 25 to gear 24 as will be readily understood. The motor 32 at the same time operates the conveyers C and c as above pointed out by means of gears 31 and 30, bevel gear 33, shaft 29, bevel gears 33 and 34; shaft 35, coupling 116 to the usual sprocket wheel and chain operating mechanism, as well understood and needs no further description.

After the motor 32 has been running for a short time and the machine together with the connected conveyers C and c appear to be running smoothly and performing their required functions, a series of inner and outer blank sections I and O are formed and properly placed on their respective conveyers C and c and the burners 115 and 115 are properly adjusted to have their flames correctly impinge against the rotating upper edges or surfaces of the inner and outer blank sections I and O moving towards each other and the operator. The operator now by means of the usual pinchers and tongs employed by glass workers removes from the conveyers first one and nearest of the inner sections I from conveyer c and places the same in the adjacent holder 40, and then by a similar operation deposits the nearest outer blank section O on conveyer C into nearest holder 41. After the above operations have been carried out and the arms 23, 51, continue rotating in the direction of the arrows shown in Figure 2, the upper cam 86 operated through rod 94 the valve 90 on the arm 51 directly above the holder 40 which has just received its blank section I and causes air pressure to be conveyed from the chamber 78 by means of pipes 100 and 105, (see Figure 1) into port 55 and cause piston 53 with its rods 54 and 59 and vacuum head 62 to be lowered to its lower position, as shown in Figure 5. While said head 62 is in this position, cam 87 operates rod 95 which in turn oscillates valve 91 causing air pressure from chamber 78 through pipe 101 to be conveyed by means of hose 106 to port 72 of cylinder 70 and cause piston 72 with its holder rod 68 to pass downwardly through the vacuum head 62, so that the perforated disk 69 seats itself into the open end of the inner section I as clearly indicated in Fig. 5. Whenever the valves 90 and 91 are reversed they connect with the outside atmosphere through port 119, as shown in Figure 8. After the disk 69 is so seated and seals the upper open end of said section I, cam 88 operates rod 96 which oscillates valve 92 which permits the vacuum chamber 79 by means of the hollow rod 68 and hose 76 and pipe 102 to partially and sufficiently exhaust the air within the inner section I so as to permit the disk 69 to hold and sustain the section I, and said valve 92 is retained in that position due to the shape of cam 88 until the following operations are completed. On further rotation of the arms 23 and 51 the cams 86 and 87 operate simultaneously the rods 94 and 95, respectively, so that they oscillate the valves 90 and 91 in the opposite direction from that previously described, whereby the air pressure from chamber 78 passes by way of pipes 100 and 104 to port 56 of cylinder 52 and causes the piston 53 to be elevated, which operation raises the vacuum head 62, rod 68 with its sustained inner section I until said section I is removed from its holder 40 and sufficiently high to permit its bottom to clear the top of the adjacent and companion holder 41, when swung around to be presently described. During this operation and at the same time the valve 91 operated by cam 87 and rod 95 causes the air pressure within chamber 78 by way of pipe 101 and through hose 107, and port 74 of cylinder 70 to further elevate piston 72 and disk 69 with its sustained inner section I, so that the lower end of the section I after being removed from its holder 40 will clear the upper end of the holder 41 when swung around in position to be now described.

On further rotation of the arms 23 and 51, the antifriction roller 49 on arm 50 engages the elevated cam 48 and causes the branches 36 and 37 to swing on the end of the arm 23 as a pivot until the pin 38 strikes the end of the slot 39 and assumes the position shown at the right of Figure 2 and in this position the holder 41 with an outer section O therein, is directly under the elevated and sustained inner section I at the end of the hollow rod 68. When the parts are disposed as just described, and upon further rotation of the arms 23 and 51, cam 86 operates through rod 94, the valve 90 to cause the air pressure from chamber 78 to pass through pipes 100 and 105 into port 55 of cylinder 52 thereby depressing piston 53 and as will be understood from previous operations and causes the vacuum head 62 to assume such a position, so that the recess 64 in flange 63 engages the annular projection 42 on holder 41, and at the same time the inner section I is inserted and suspended within the outer section O in the position clearly shown in Figure 6, so that a space is provided between the inner wall of the outer section and outer wall of the inner section.

While the inner and outer sections I and O are in this position and upon further rotation of the arms 23 and 51, the cam 89 operates rod 97 which oscillates valve 93 which allows vacuum chamber 79 by means of pipe 103, hose 108 and ports 65 in vacuum head 62 to exhaust the air within said head 62 and within the outer section O. Upon further rotation of arms 23 and 51 cam 87 operates rod 95 which in turn oscillates valve 91 to connect pressure chamber 78 through pipe 101, hose 106 and port 73 of cylinder 70 thereby lowering piston 72 with its rod 68 and disk 69 with its sustained inner section I to such a degree so that the hot and sticky glass surfaces of the upper portion of the outer section O and outer portion of the upper end of the inner section I are forced together with sufficient pressure and to such an extent as to form continuous joint or union between said sections I and O and be united as to form one integral structure with the space between them a vacuum and hermetically sealed.

After the inner and outer sections I and O are united and sealed together to form a vacuum walled container, and said arms 23 and 51 are further rotated, cams 88 and 89 act simultaneously to operate at the same time valves 92 and 93 respectively, and said valves 92 and 93 are so oscillated that the hose 108 connect with the atmosphere through port 117 see Figure 9, and hose 76 connects also with the atmosphere by port 118, see Figure 10, and hence the vacua in the vacuum head 62 and in the inner section I are broken. Upon further rotation of the arms 23 and 51, the cams 86 and 87 acting simultaneously operate cam rods 94 and 95 which oscillate valves 90 and 91 to such positions so that the air pressure from chamber 78 is conveyed by the pipes 100, 104 and pipe 101 and hose 107 to the undersides of the pistons 53 and 72 as will be readily seen from the operations already described, and the upward movements of said pistons 53 and 72 will elevate the vacuum head 62 and disk 69 away from the holder 41 containing the completed or finished vacuum walled container V, shown in Figure 14 within said holder 41. During the last phase of rotation and operation of the pistons 53 and 72, the anti-friction roller 49 on arm 50 engages the cam 46, see Figure 2, to keep the holder 41 with its finished container therein in a proper and steady position to enable a second operator to remove said finished container from the machine and to be transported to any other part of the plant for annealing or other purposes.

Should the finished container V for any reason stick in its holder it may be quickly lifted out by pushing upwardly against the action of the spring 44. Upon further rotation of the machine the anti-friction roller 49 engages with cam 47, thereby causing the branches 36 and 37 with their holders 40 and 41 to assume their original and receiving positions ready to repeat the cycle of operation herein described. The operation just described with respect to one arm is repeated by each following arm and continuously thus making the machine a highly efficient and time and labor saving device and fully carrying out all the advantages and objects recited in the statement of invention, and while I have shown and described my preferred form of the apparatus I do not limit myself to the particular arrangement or number of arms or holders 40 and 41, as they may be modified in many ways without departing from the essential and broad features and applications of the invention.

While I have shown and described a patentable process capable of being carried out by the machine herein disclosed, I do not herein make claims to said process as this is the subject-matter of a separate and independent application filed by me March 20, 1920, and having Serial No. 367,472.

What I claim is:

1. A machine for manufacturing vacuum wall containers which comprises a holder to receive an outer section of a vacuum container, means for holding an inner section and suspending it in the holder and within an outer section held therein, means for establishing a vacuum between the inside of the outer section and outer side of the inner section, and means for forcing the outer and under edge of the upper portion of the inner section against the top edge of the upper portion of the outer section to seal and enclose the space between said inner and outer sections.

2. A machine for manufacturing vacuum wall containers which comprises a holder to receive an outer section of a vacuum container, another holder for an inner section of a vacuum container, means for lifting an inner section from its holder and suspending it in the other holder and within the outer section held therein, means for exhausting the air between the inside of the outer section and outer side of the inner section, and means for forcing the outer and under edge of the upper portion of the inner section against the top edge of the upper portion of the outer section to seal and enclose the space between said inner and outer sections.

3. A machine for manufacturing vacuum wall containers which comprises an upright column, an arm rotatable about said column, a holder to receive an outer section of a vacuum container on said arm, a second holder for an inner section of a vacuum container on said arm, means for lifting an inner section from its holder and suspending it in the other holder and within an outer section held therein, means for exhausting the air between the inside of the outer section and outer side of the inner section, and means for forcing the outer and under edge of the upper portion of the inner section against the top edge of the upper portion of the outer section to seal and enclose the space between said inner and outer sections.

4. A machine for manufacturing vacuum wall containers which comprises an upright column, a plurality of arms rotatable about said column, a holder to receive an outer section of a vacuum container on each arm, a second holder for an inner section of a vacuum container on each arm, means for lifting an inner section from its holder and suspending it in the other holder and within an outer section held therein, means for exhausting the air between the inside of the outer section and outer side of the inner section, and means for forcing the outer and under edge of the upper portion of the inner section against the top edge of the upper portion of the outer section to seal and enclose the space between said inner and outer sections.

5. A machine for manufacturing vacuum wall containers which comprises an upright column, a plurality of arms rotatable about said column, a holder to receive an outer section of a vacuum container on each arm, a second holder for an inner section of a vacuum container on each arm, a vacuum suction device for lifting an inner section from its holder and suspending it in the other holder and within an outer section held therein, a vacuum head for exhausting the air between the inside of the outer section and outer side of the inner section, and a pressure actuated device for forcing the outer and under edge of the upper portion of the inner section against the top edge of the upper portion of the outer section to seal and enclose the space between said inner and outer sections.

6. A machine for manufacturing vacuum wall containers which comprises an upright column, a plurality of arms rotatable about said column, a holder to receive an outer section of a vacuum container on each arm, a second holder for an inner section of a vacuum container on each arm, a vacuum suction device for lifting an inner section from its holder and suspending it in the other holder and within an outer section held therein and a vacuum head, a vacuum head for exhausting the air between the inside of the outer section and outer side of the inner section, and a pressure actuated device for forcing the outer and under edge of the upper portion of the inner section against the top edge of the upper portion of the outer section to seal and enclose the space between said inner and outer sections.

7. A machine for manufacturing vacuum wall containers which comprises an upright column a plurality of arms rotatable about said column, a holder to receive an outer section of a vacuum container on each arm, a second holder for an inner section of a vacuum container on each arm, a vacuum suction device on each arm for lifting an inner section from its holder and suspending it in the other holder and within an outer section held therein and a vacuum on said arm, a vacuum head on each arm for exhausting the air between the inside of the outer section and outer side of the inner section, and a pressure actuated device on each arm for forcing the outer and under edge of the upper portion of the inner section against the top edge of the upper portion of the outer section to seal and enclose the space between said inner and outer sections.

8. A machine for manufacturing vacuum wall containers which comprises an upright column, a plurality of arms rotatable about said column, a holder to receive an outer section of a vacuum container on each arm, a second holder for an inner section of a vacuum container on each arm, a vacuum suction device on each arm for lifting an inner section from its holder and suspending it in the other holder and within an outer section held therein and a vacuum head on said arm, a vacuum head on each arm for exhausting the air between the inside of the outer section and outer side of the inner section, a pressure actuated device on each arm for forcing the outer and under edge of the upper portion of the inner section against the top edge of the upper portion of the outer section to seal and enclose the space between said inner and outer sections, a valve for controlling each of said vacuum suction devices, vacuum heads and pressure actuated devices, and cams for properly actuating said valves.

In testimony whereof I affix my signature.

CHARLES A. ROHLAND.